Figure 1:
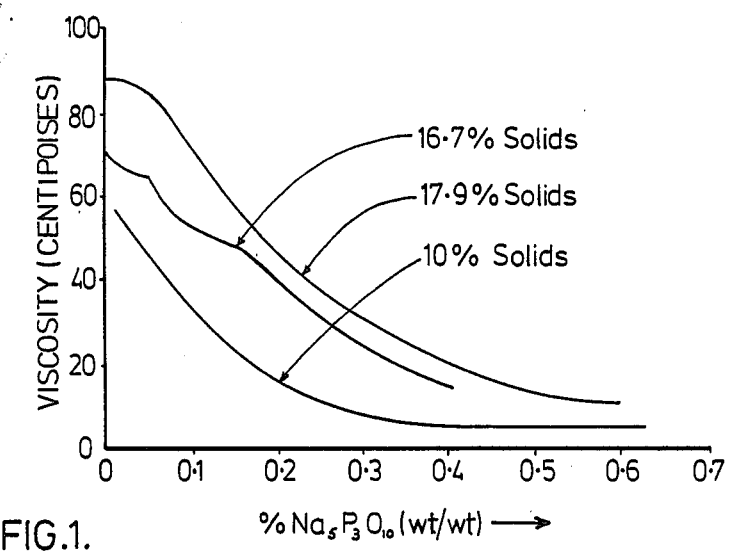

United States Patent [19]

Krofchak

[11] 4,279,635
[45] Jul. 21, 1981

[54] PROCESS FOR TREATING PHOSPHATIC CLAY SUSPENSIONS

[76] Inventor: David Krofchak, 160 Torbay Rd., Markham, Ontario, Canada, L3R 1G6

[21] Appl. No.: 52,376

[22] Filed: Jun. 27, 1979

[30] Foreign Application Priority Data

Jul. 18, 1978 [GB] United Kingdom ............... 30236/78

[51] Int. Cl.³ ............................................ C05B 21/00
[52] U.S. Cl. ........................................ 71/4 Z; 71/51; 71/52; 71/53; 71/64 SC; 210/751; 210/907; 423/167; 405/263
[58] Field of Search ................... 71/40, 41, 42, 64 SC, 71/61-63, 51, 47, 52; 210/42 R, 51, 52, DIG. 29, 751, 907; 423/167; 405/263, 264, 258; 209/5; 137/13

[56] References Cited

U.S. PATENT DOCUMENTS

| 2,381,514 | 8/1946 | Phelps ........................ 209/5 |
| 2,437,387 | 3/1948 | Hodgson ................... 405/263 |
| 2,660,303 | 11/1953 | Haseman ................... 209/5 |
| 2,947,418 | 8/1960 | Gooch ....................... 210/68 |
| 3,446,742 | 5/1969 | Bacon ..................... 210/42 R X |
| 3,680,698 | 8/1972 | Liu et al. ................. 210/73 X |
| 3,698,862 | 10/1972 | Jolly ....................... 137/13 X |
| 3,761,239 | 9/1973 | Cook et al. ............... 71/64 SC X |
| 3,763,041 | 10/1973 | Cook et al. ............... 210/42 R |
| 3,774,402 | 11/1973 | Muzychenko et al. ..... 405/263 |
| 4,038,183 | 7/1977 | Davidtz ................... 210/47 |

FOREIGN PATENT DOCUMENTS

| 2800915 | 9/1978 | Fed. Rep. of Germany ............ 210/51 |
| 2129035 | 10/1972 | France ................................... 210/51 |
| 50-08778 | 1/1975 | Japan ..................................... 210/51 |
| 50-78153 | 6/1975 | Japan ..................................... 210/51 |
| 53-21381 | 7/1978 | Japan ................................... 210/42 R |

Primary Examiner—Ferris H. Lander
Attorney, Agent, or Firm—Robert F. Delbridge; Arne I. Fors

[57] ABSTRACT

A process for treating thickened phosphatic clay suspensions produced in the processing of phosphate ore by water beneficiation, and which have a solids content of from about 5% to about 30%. A deflocculating agent is mixed with the suspension to cause deflocculation of the suspension to an extent sufficient to reduce the viscosity of the sludge to a value enabling the deflocculated suspension to be readily pumped from one location to another. The deflocculated suspension is subsequently mixed with an additive compound comprising an alkaline earth metal oxide or hydroxide in an amount sufficient to cause the formation of large silicate molecules with resultant gelling and setting of the sludge into an inert solid material.

13 Claims, 3 Drawing Figures

PROCESS FOR TREATING PHOSPHATIC CLAY SUSPENSIONS

This invention relates to the treatment of phosphatic clay suspensions, that is to say suspensions of phosphorus minerals, sand and clay.

Such suspensions may be produced for example in the processing of phosphate ore, such as the phosphate ore found in Florida. Phosphate ore is usually subjected to beneficiation treatment including washing and flotation steps to separate phoshorus minerals such as apatite from non-phosphorus containing minerals. In this treatment, the phosphate minerals recovered are usually those with a particle size greater than about 150 mesh, and the recovered phosphate minerals are subjected to conventional processing treatment.

A by-product of the beneficiation treatment is an aqueous suspension containing an amount of solids, frequently about 3% by weight, with a particle size which in perfect circumstances is less than about 150 mesh but which in practice is frequently larger. It is well known that some of the solids in suspension are phosphate minerals, with most of the other solids being silica containing compounds such as clay and sand. Although many different methods have been tried, no economically feasible method of dealing with these suspensions has been found, with the result that they are usually dumped in large settling areas. A typical settling area is from 400 to 600 acres in size and is surrounded by an earth dam up to 60 feet high.

In the settling areas, the suspension normally thickens to about 10% solids in a few days, to about 15% solids in a few months, and after several months reached about 20% solids, at which stage the thickening substantially ceases. At this thickness the suspension is commonly referred to as a slime. It will be noted that, at 20% solids, each ton of solids retains about 4 tons of interstitial water. Since the phosphate industry in Florida produces about 40 million tons of such solids (dry basis) in suspension annually, the magnitude of the disposal problem presented by the suspensions can be readily appreciated. By 1976 for example, over 50,000 acres of settling areas existed in Florida with about 300 miles of dams. Additionally, about 4,000 acres of new settling areas are required each year.

Because of the vast areas required for settling areas, there is a corresponding loss of land area for other use. Also, there is the ever present danger of dam failure. Further, an appreciable amount of phosphorus values are present in the suspended solids, and in fact the phosphorus concentration in the suspended solids may be of the same order as the phosphorus concentration in the phosphate ore originally mined. Thus, at the present time, a significant amount of phosphorus values are not recovered. With the present use of settling areas, there is also the disadvantage that a large amount of water is present in the suspension and not available for other use.

It is therefore an object of this invention to provide an economical feasible method of treating thickened phosphatic clay suspensions.

According to the invention, a thickened phosphatic clay suspension with a solids content of from about 5% to about 30% is mixed with a sufficient amount of a deflocculating agent to cause deflocculation of the suspension to an extent sufficient to reduce the viscosity of the suspension to a value at which the deflocculated suspension can be pumped from one location to another. The deflocculated suspension is subsequently mixed with a sufficient amount of an additive compound comprising an alkaline earth metal oxide or hydroxide to cause formation of large silicate molecules with resultant gelling and setting of the suspension into an inert solid material.

The combination of deflocculation and solidification steps in accordance with the invention is an unexpectedly successful solution to the problems mentioned earlier with respect to the disposal of such suspensions in settling areas. The solution provided by the invention is both economical and technically successful.

The resultant solid material is very stable and may be used for fill material, for example to backfill the area from which the phosphate rock is originally mined. After the deflocculation step, the suspension can be pumped from a temporary settling area to a location where fill is desired. This additive compound may be mixed with the deflocculated suspension while the suspension is being pumped to the site where it is to be used as fill. If desired, the amount of addition compound added may be maximum possible to produce a product of greater strength suitable for use as road base material or other load supporting use.

Since the deflocculated slurry contains phosphorus values, the suspension may, after mixing with the additive compound and before gelling and setting, be spread on a relatively infertile land area to improve its fertility. If desired, a controlled amount of sulphuric acid or phosphoric acid may be added to the deflocculated suspension before gelling and setting to convert phosphorus compounds in the suspension to compounds which act as agricultural fertilizer.

It has also been found that, if the deflocculated suspension is allowed to stand before the additive compound is mixed therewith, not only do some of the suspended solids settle out, but that the settled solids are primarily phosphate and sand fines rather than clay fines. As mentioned earlier, the particle size of the solids in suspension is usually less than about 150 mesh, and the particles settling out are of a size larger than about 325 mesh. In suspensions of the kind with which the present invention is concerned, it has been found that a major portion of the phosphate fines in the suspended solids is of particles with sizes from 150 to 325 mesh, and a major portion of the clay fines is of particle sizes less than 325 mesh. Since the deflocculation step produces a suspension in which the larger particles settle out, the settled solids are primarily phosphate and sand fines. The phosphate material recovered in this way can if desired be treated in the main phosphate rock treatment process. The economic advantages of recovering such phosphate material which previously had been left in the settling areas are self-evident.

If desired, sand may be added to the deflocculated suspension before, during or after mixing of the additive compound therewith to increase the silica content.

The deflocculation agent may be an alkali metal phosphate or silicate, and it has been found that sodium tripolyphosphate is especially useful because it also acts as a sequestering agent to cause sequestration of some of the constituents of the suspension in such a manner that subsequent gelling and setting of the suspension is facilitated. The amount of sodium tripolyphosphate added may be in the range of from about 0.045 to about 0.45% of dry weight of the suspension. In addition or alternatively, sodium silicate may be used. Advantageously, the deflocculating agent is applied in solution to the suspension by adding the solution to the inlet of the pump which recirculates the suspension. Since such a pump merely recirculates the suspension, the fact that the suspension is relatively difficult to pump is not particularly disadvantageous. The advantage of the defloculation step is that the suspension is lowered in viscosity to such an extent that the deflocculated suspension can readily be pumped a considerable distance.

As mentioned earlier, phosphate fines may be allowed to settle out of the deflocculated suspension before the solidification step. If phosphate fines are not to be recovered in this way, it will probably be sufficient if the deflocculation step reduces the viscosity of the suspension to below about 30 centipoises for easy pumping. However, if the phosphate fines are to be permitted to settle out after deflocculation, it is advantageous if the deflocculation step is such that the viscosity is reduced to less than 20 centipoises, and preferably to less than 10 centipoises.

Also, as previously mentioned, the additive compound comprises an additive earth metal oxide or hydroxide. Suitable compounds are calcium oxide, calcium hydroxide, magnesium oxide and magnesium hydroxide. Cement is thus a suitable material. The amount of additive compound may be between from 0.045 to 9% of dry weight of the deflocculated suspension.

The additive compound may be mixed with the suspension while the suspension is being pumped through a pipe line from one site to another. The additive compound may be added to the inlet of a pump which pumps the suspension through the pipe line, or may be injected into the pipe line with the resultant mixture being agitated to ensure adequate mixing.

Where sand is added before gelling and setting occurs, the amount of sand added may be from about 4.5% to about 400% by dry weight of the suspension.

As an alternative to use of the solid product of the process of the invention as fill material, the solidification step may be performed in such a manner that the gelling and setting material is piled in layers on dry ground to progressively form a hill in which lower layers act as a drainage system for upper layers, so that the final hill structure is a solid mass of solidified material. Such hills can of course be shaped during production to suit the nature of the surroundings. In certain cases it may also be possible to treat such material for the extraction of other materials such as alumina and uranium.

Specific examples of the invention will now be described.

EXAMPLE 1

Phosphatic clay suspensions of various solids content were treated with various amounts of sodium tripolyphosphate as deflocculating and sequestering agent, and the results are shown in the graph of FIG. 1.

In tests where the viscosity of the deflocculated suspension was less than 10 centipoises, particles from 150 to 325 mesh size rapidly settled out and were conveniently separated by cyclone or centrifuge and found to contain substantial amounts of apatite.

Figure 2:
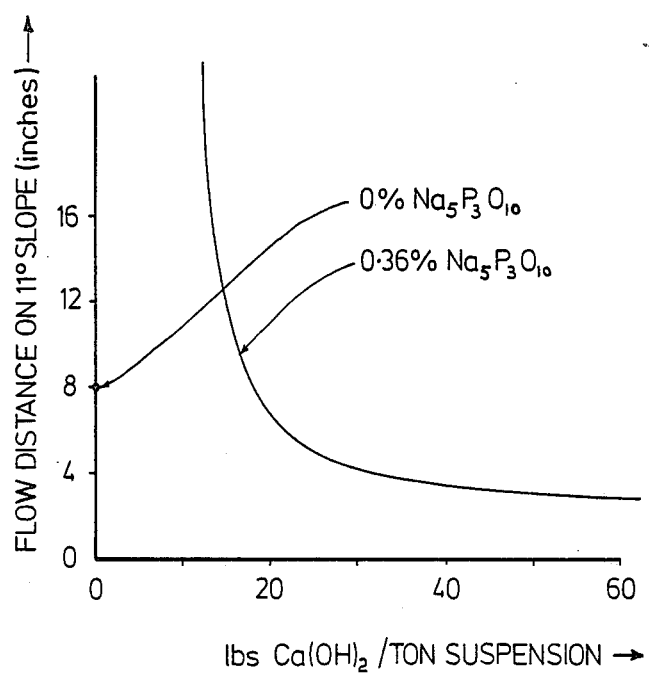
Figure 3:
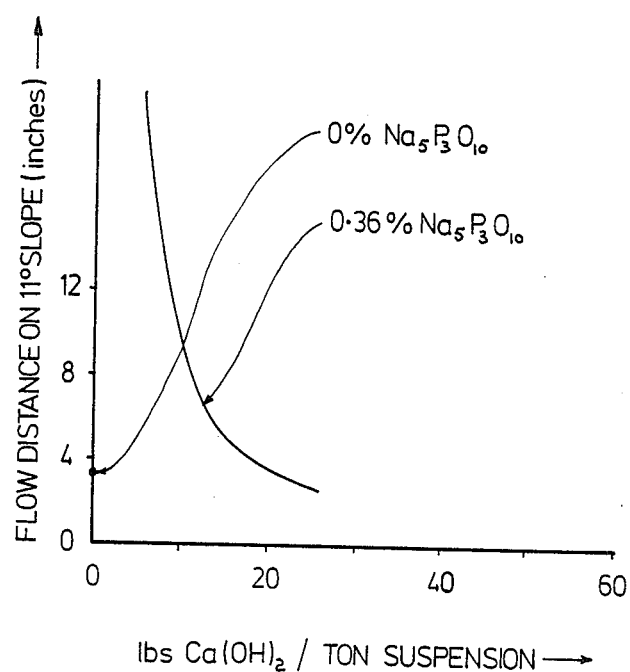

Lime was then mixed with the defloculated suspension in various tests in amounts to cause resultant gelling and setting of the deflocculated suspension into a solid product. The gelling properties of the mixture were assessed by measuring the flow distance of the material on an 11° slope within 5 minutes of mixing with the additive compound. The results are shown in FIGS. 2 and 3, with FIG. 2 being the results for a suspension originally of 13% solids content and FIG. 3 showing the results for a suspension of originally 20% solids content. FIGS. 2 and 3 also show the flow distance of the original suspension, i.e. before addition of any deflocculating agent or additive compound.

EXAMPLE 2

Several drums of phosphatic clay suspension were obtained directly from the production flow of a large phosphate mine in Florida, the production flow rate from the plant concerned being 50,000 gallons per minute of suspension containing 3% solids, the suspension being normally discharged to a conventional settling area.

The suspension was allowed to settle for several weeks until it was observed that settling had stopped. Free standing water was syphoned off and the remaining suspension was found to contain 14% solids. A 10% solution of sodium tripolyphosphate was added in an amount of 0.4% of dry weight of the suspension. Within 5 seconds of mixing, the suspension became very fluid, almost like water. After 30 minutes of settling, the liquified suspension was decanted into another vessel and calcium hydroxide was mixed in in the amount of 18 pounds per ton of suspension solids. Within 2 or 3 minutes the suspension was observed to be thickening up and becoming more viscous. At this stage, the suspension was poured onto a sandy soil and left to cure in the sun. The thickened product stopped flowing on the pile at angles of repose of about 2 inches per linear foot.

The sediment remaining after the 30 minutes of settling and after decantation was analyzed and found to contain about 15% $P_2O_5$, which is about equal to the $P_2O_5$ content of the phosphate feed material in a typical beneficiation phosphate plant.

The solidified material was substantially hard after 30 days of curing and had a compressive strength over 200 psi when tested with a standard soil penetrometer. Also, when dropped into water, samples of the solidified material did not fall apart, which is in contrast to untreated clays which if dried into hard lumps immediately and dramatically fall apart on immersion in water and revert back to flowable or liquid clay slimes.

Other embodiments and examples of the invention will be apparent to a person skilled in the art, the scope of the invention being defined in the appended claims.

What I claim as new and desire to protect by Letters Patent of the United States is:

1. A process for treating thickened phosphatic clay suspensions produced in the processing of phosphate ore by water beneficiation, said suspensions having a solids content of from about 5% to about 30%, said process comprising mixing a sufficient amount of deflocculating agent with the suspension to cause deflocculation of the suspension to an extent sufficient to reduce the viscosity of the sludge to a value enabling the deflocculated suspension to be readily pumped from one location to another, said deflocculating agent comprising an alkali metal phosphate pumping said deflocculated suspension of reduced viscosity from said one location to another, and subsequently mixing with the deflocculated suspension an additive compound comprising an alkaline earth metal oxide or hydroxide in an amount sufficient to cause the formation of large silicate molecules with resultant gelling and setting of the sludge into an inert solid material.

2. A process according to claim 1 wherein, after the deflocculation step, the deflocculated suspension is allowed to settle to permit fine phosphate material to settle out, the settled phosphate material is removed, and the remaining suspension is subjected to the solidification step.

3. A process according to claim 2 wherein a sufficient amount of deflocculating agent is added to reduce the viscosity of the suspension to a value lower than about 20 centipoises.

4. A process according to claim 3 wherein the viscosity is reduced to less than about 10 centipoises.

5. A process according to claim 1 wherein the deflocculating agent comprises sodium tripolyphosphate.

6. A process according to claim 5 wherein sodium tripolyphosphate is added in an amount of from 0.045 to about 0.45% of dry weight of the suspension.

7. A process according to claim 1 wherein the amount of deflocculating agent added is sufficient to reduce the viscosity of the suspension to a value lower than about 30 centipoises.

8. A process according to claim 1 wherein the additive compound is mixed with the deflocculated suspension while the suspension is being pumped from one location to a location where the suspension is to gel and set.

9. A process according to claim 1 wherein, before the deflocculated suspension gels and sets, an amount of sand is added to increase the silica content of the resultant solid product.

10. A process according to claim 9 wherein the amount of sand added is from about 4.5% to about 400% by dry weight of the suspension.

11. A process according to claim 1 wherein, after mixing with the additive compound and before gelling and setting, the suspension is spread on a relatively infertile area to improve its fertility.

12. A process according to claim 1 wherein the amount of additive compound added is the maximum possible to provide an inert solid material product of a strength suitable for use as road base material or other load-supporting use.

13. A process according to claim 1 wherein the amount of additive compound added is from about 0.045% to about 9% of dry weight of the flocculated suspension.

* * * * *